United States Patent
Bingel et al.

(10) Patent No.: US 6,826,265 B1
(45) Date of Patent: Nov. 30, 2004

(54) DSL-READY POTS DEVICE AND METHOD

(75) Inventors: Thomas Bingel, Belleair Beach, FL (US); Ramon Hazen, N. Redington Beach, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/579,314

(22) Filed: May 25, 2000

Related U.S. Application Data (60) Provisional application No. 60/182,805, filed on Feb. 16, 2000.

(51) Int. Cl.[7] .............................................. H04M 11/06
(52) U.S. Cl. ................................. 379/93.01; 379/387.01
(58) Field of Search ........................ 379/93.01, 93.05, 379/93.06, 93.07, 93.09, 387

(56) References Cited

U.S. PATENT DOCUMENTS

| | | | |
|---|---|---|---|
| 5,757,803 A | 5/1998 | Russell et al. ............... | 370/494 |
| 5,848,150 A | 12/1998 | Bingel ......................... | 379/399 |
| 6,028,919 A | 2/2000 | Bingel et al. ................ | 379/142 |
| 6,101,216 A * | 8/2000 | Henderson et al. ........ | 379/93.28 |
| 6,115,466 A | 9/2000 | Bella .......................... | 379/399 |
| 6,144,733 A | 11/2000 | Amrany et al. ............. | 379/373 |
| 6,301,337 B1 * | 10/2001 | Scholtz et al. ............ | 379/93.06 |
| 6,459,790 B1 * | 10/2002 | Eckert et al. ............. | 379/93.05 |
| 6,477,249 B1 | 11/2002 | Williamson et al. ..... | 379/399.01 |
| 6,483,914 B1 | 11/2002 | Williamson et al. ..... | 379/399.01 |

* cited by examiner

Primary Examiner—Minsun Oh Harvey
Assistant Examiner—Daniel Swerdlow
(74) Attorney, Agent, or Firm—Thomas, Kayden, Horstemeyer & Risley (57) ABSTRACT

A plain old telephone system (POTS) device, for example but not limited to, a telephone, facsimile machine, analog modem, caller identification (ID) system, speaker phone, cordless phone, etc., employs an on-board POTS filter to enable reliable and efficient decoupling of a POTS channel from one or more xDSL channels on a telephone connection, while permitting and not interfering with the xDSL channels. The POTS device, which connects to a subscriber loop associated with the public service telephone system, includes a subscriber loop connection switch (for example, a hook switch), a POTS transmitter, receiver, or transceiver, and a low pass filter interconnecting the subscriber loop connection switch with the transmitter, receiver, or transceiver. The switch effectively isolates the POTS filter from the telephone line when the POTS device is disconnected, or is on hook, and interfaces the telephone line through the POTS filter to the POTS transceiver when the POTS device is connected, or is off hook. The arrangement enhances DSL device performance, network stability, sidetone, ringer load, and termination impedance and allows greater flexibility in the choice of filter elements, in that passive and active elements can be utilized and in that filters of higher order can be employed.

35 Claims, 6 Drawing Sheets

DSL-READY POTS DEVICE AND METHOD

For this application and pursuant to 35 U.S.C. Section 119, the inventors herein claim priority to and the benefit of the filing date of copending commonly assigned provisional application, "ADSL Filter Included Within An ADSL-Ready Phone, filed Feb. 16, 2000, and assigned Ser. No. 60/182,805. The foregoing document is incorporated by reference in its entirety.

FIELD OF THE INVENTION

The present invention generally relates to the art of data communications and telephony. More particularly, the invention relates to a plain old telephone system (POTS) device, or a device that operates in connection with the Public Service Telephone Network (PSTN), for example but not limited to, a telephone, facsimile machine, analog modem, caller ID system, speaker phone, cordless phone, etc., that employs an on-board POTS filter to enable reliable and efficient decoupling of a POTS channel from one or more xDSL channels on a telephone connection, while reducing interference imposed upon the xDSL channels.

BACKGROUND OF THE INVENTION

Recently, in the art of telephony, 2-wire copper telephone connections have been utilized for communicating more than one simultaneous communications channels, such as digital data and analog voice signals. For example, a high speed digital subscriber line (XDSL, e.g., asymmetric DSL (ADSL), symmetric DSL (SDSL), rate adaptive digital subscriber line (RADSL), very high speed ADSL (VADSL), etc.) channel and a plain old telephone system (POTS) channel can be established over a single physical 2-wire connection. The signals are typically separated in frequency. The POTS channel usually exhibits a frequency spectrum of about 0 KHz to about 4 KHz, whereas the XDSL channels exhibit a frequency spectrum of about 20 KHz to about 500 KHz.

A POTS splitter, also known as a POTS filter, a telephone filter, a microfilter, or a CP (customer premises) filter, has traditionally been utilized to decouple the channels, or separate the POTS channel from the other channels, due to non-linearities inherent in most, if not all central office powered telephones. The POTS filter is usually implemented in series with the telephone in order to reduce the DSL power imparted on the telephone electronics, which imposes interference upon the POTS and the DSL signals.

A POTS splitter is typically a passive or active one-to-two port device. The POTS splitter is installed between a telephone jack and the telephone itself and is also connected to a DSL device. It includes a POTS filter (a one-to-one port device) situated between the telephone line and the telephone that is designed to minimize high frequency transients produced by on-hook/off-hook transitions, so as to prevent tainting or slowing of the high speed data on the DSL channel. Also, it is usually configured to provide a high impedance to the telephone line in the DSL frequency band in order to prevent DSL power from being imparted on the POTS communications device that is connected to the line. In essence, the filter reduces incident DSL signal power to reduce DSL signal intermodulation (IMD), which undesirably creates audio noise heard in the receiver of a telephone, and interferes with the DSL signal.

Because of the foregoing requisite functionality, POTS splitters are usually expensive devices and are oftentimes installed on a physical wall of a customer premises (CP), such as on an outside wall of a building. Furthermore, generally, POTS splitters require installation by a skilled telephone company worker, not the premise owner, resulting in undesirable installation time, labor, and expense. Distributed microfilters per phone are an increasingly used alternative to the outside wall splitter for the reason cited.

The specification of POTS splitters and filters has been the subject of several industry standards bodies. For example, see American National Standards Institute, ANSI T1.413-1995, Sections 8 and 10, regarding ADSL/POTS splitters. Moreover, as an example of a possible implementation of a POTS splitter, see J. Cook, P. Sheppard, "ADSL and VADSL Splitter Design and Telephony Performance," *IEEE Journal on Selected Areas in Communications*, December 1995.

Commonly assigned U.S. Pat. No. 5,848,150 to T. J. Bingel, who is also one of the inventors herein, describes a passive one-to-one port POTS filter for enabling decoupling of a first channel, such as a POTS channel, from a second channel, such as an xDSL channel, that is communicated simultaneously with the first channel on a telephone connection, while permitting and not appreciably interfering with the second channel. The POTS filter can be connected between the telephone jack and a telephone or can be situated within the telephone. Each POTS filter has a passive automatic control mechanism and a passive first channel filter (e.g., a POTS filter). The automatic control mechanism is configured to isolate the first channel filter when a respective first communications device is inactive (on-hook). Further, the distributed filter is configured to interface communications on the first channel (e.g., POTS channel) on the telephone connection with the respective first communications device when the first communications device is active (off-hook). Moreover, a second communications device (for example, a modem) is connected to the telephone connection and communicates signals over a second channel (xDSL, e.g., ADSL, SDSL, RADSL, VADSL, etc.), simultaneously with the first channel. As a result of the invention, an inexpensive passive distributed filter system associated with the POTS channel prevents on-hook/off-hook transitions from interfering with the second channel communications.

Although meritorious and effective to an extent, the passive distributed filter system implements a control mechanism, and it would be desirable to implement such a filtering function with less complexity and requisite circuitry. Furthermore, the filter usually contains inductors in series with the telephone line and capacitors in parallel with the telephone. The presence of these reactive elements introduces concerns about excessive POTS attenuation, reduced PSTN network stability, poor telephone sidetone, increased ringer loading, and degraded termination impedance, especially with multiple telephones on the telephone line (a typical scenario). Thus, a heretofore unaddressed need exists in the industry for an improved filtering systems and methods.

SUMMARY OF THE INVENTION

The present invention provides a plain old telephone system (POTS) device, for example but not limited to, a telephone, facsimile machine, analog modem, caller identification (ID) system, speaker phone, cordless phone, etc., that employs an on-board POTS filter to enable reliable and efficient decoupling of a POTS channel from one or more XDSL channels on a telephone connection, while permitting and not interfering with the XDSL channels. In general, the POTS filter is situated after the telephone connection switch (for example, a hook switch). The switch effectively isolates the POTS filter from the telephone line when the POTS device is disconnected, or is "on hook," and interfaces the telephone line through the POTS filter to the POTS transmitter, receiver, or transceiver when the POTS device is connected, or is "off hook."

In architecture, the POTS device, which connects to a subscriber loop associated with the public service telephone network (PSTN), includes a subscriber loop connection switch (for example, a hook switch), POTS electronics (including a transmitter, receiver or both (transceiver)), and a low pass filter (LPF) interconnecting the subscriber loop connection switch with the POTS electronics. The switch effectively isolates the POTS filter from the telephone line when the POTS device is disconnected, or is on hook, and interfaces the telephone line through the POTS filter to the POTS electronics when the POTS device is connected, or is off hook. The arrangement enhances DSL device performance, network stability, sidetone, ringer load, and termination impedance and allows greater flexibility in the choice of filter elements, in that passive and active elements can be utilized and in that filters of higher order can be employed.

The invention can also be conceptualized as providing a method for a POTS device that is connected to a subscriber loop. Broadly stated, the method can be summarized by the following steps: coupling a subscriber loop connection switch to a POTS transmitter, receiver, or transceiver; and filtering out high frequency signals from voice band signals communicated between the loop connection switch and the transmitter, receiver, or transceiver.

The invention has numerous advantages, a few of which are delineated hereafter, as merely examples.

An advantage of the invention is that it provides a way of achieving telephone XDSL compatibility without an external CP telephone filter. That is, the invention teaches a method for telephone manufacturers to design and produce DSL compatible telephones.

Another advantage of the invention is that it can be used in any data communication device that connects to a single physical connection having at least two communications channels (e.g., a high speed xDSL link in combination with a POTS link), where the channels are separated by frequency, and that includes a telephone line connection/disconnection switch (such as a hook switch).

Another advantage of the invention is that it can be used to effect economical deployment of a XDSL communications channels simultaneously in combination with a POTS communications channel on a telephone connection.

Another advantage of the invention is that it is simple in design, efficient in operation, and easily and economically implemented and manufactured on a mass scale.

Another advantage of the invention is that passive components, active components, or a combination of both can be utilized in the filter.

Another advantage of the invention is that it is very desirable for typical homeowners and consumers in that it does not require sophisticated installation.

Another advantage of the invention is that it meets surge and safety requirements of industry standard UL1950, Third Edition, and applicable requirements of FCC, Part 68.

Other systems, methods, features, and advantages of the present invention will become apparent to one with skill in the art upon examination of the following drawings and detailed description. It is intended that all such additional systems, methods, features, and advantages be included herein within the scope of the present invention and protected by the claims.

BRIEF DESCRIPTION OF THE DRAWINGS

The invention can be better understood with reference to the following drawings. The drawings are not necessarily to scale, emphasis instead being placed upon clearly illustrating principles of the present invention. Furthermore, in the drawings, like reference numerals designate corresponding part throughout the several views.

DETAILED DESCRIPTION OF THE PREFERRED EMBODIMENT

Figure 1:
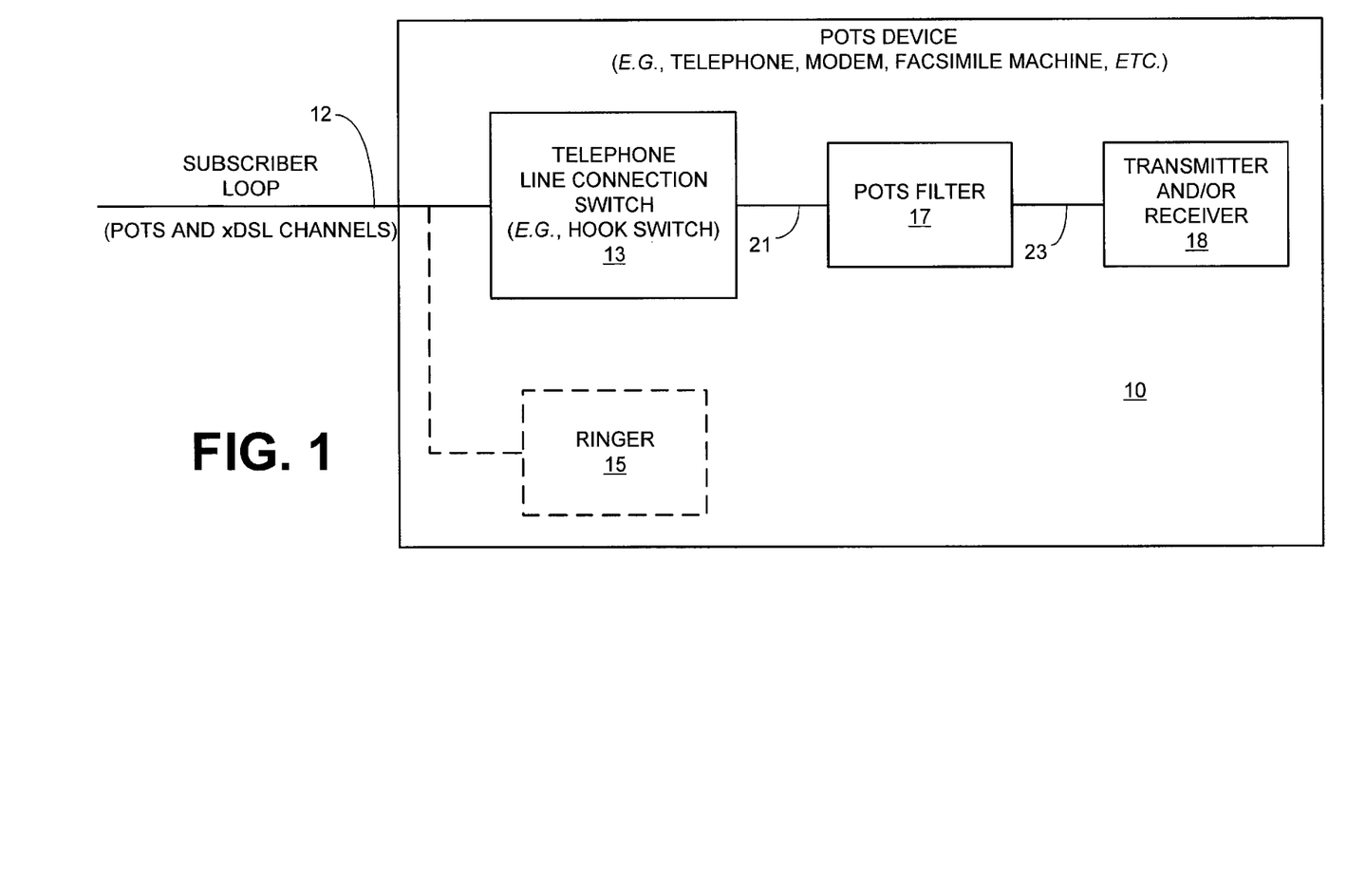
FIG. 1 is a circuit diagram of a POTS device employing an on-board POTS filter in accordance with the present invention.

A DSL-ready POTS device in accordance with the present invention is illustrated in FIG. 1 and is generally denoted by reference numeral 10. The DSL-ready POTS device 10 can be, for example but not limited to, a telephone, facsimile machine, analog modem, caller identification (ID) system, speaker phone, cordless phone, etc. The DSL-ready POTS device 10 can be directly connected to a subscriber loop 12 having a POTS channel and one or more other coexisting channels, such as high speed digital subscriber line channels (XDSL, e.g., T1, ADSL, SDSL, RADSL, VADSL, etc.) to effectively decouple the POTS channel from the loop 12, while minimizing adverse effects to the one or more DSL channels.

In architecture, as shown in FIG. 1, the DSL-ready POTS device 10 includes a telephone line connection switch 13, for instance a hook switch in the case of a conventional telephone, that connects the subscriber loop 12 to a one-to-one port POTS filter 17, when appropriate, as well as disconnects the subscriber loop 12 and the POTS filter 17, when appropriate. The POTS filter 17 preferably exhibits the following approximate signal characteristics: −3 dB cutoff frequency of 4 KHz to 25 KHz; a stop band of approximately 25 KHz to 1.104 MHz; stop-band attenuation of at least 20 dB; and a passband of 0 (DC) to −3 dB cutoff frequency. Some POTS devices 10 will have a ringer 15, such as in the case of a conventional telephone, and as illustrated by phantom lines in FIG. 1, the ringer 15, if present, would connect directly (unswitched) to the subscriber loop 12. A transmitter, receiver, or both (i.e., a transceiver), denoted collectively by reference numeral 18 is connected to the POTS filter 17. The transmitter, receiver, or transceiver 18 implements the modulation and other signal processing functions, as appropriate.

It is possible that the filter 17 could be situated somewhere within the electronics block 18. The key is placing it after a switch that connects and disconnects it relative to the subscriber loop 12. Some circuit elements can be interposed between the switch 13 and the POTS filter 17, for example but not limited to, a polarity guard, which is well known in the art and which enables the tip and ring lines to be interchanged without hazard or disfunction.

In operation, the telephone line connection switch 13 automatically either isolates or interfaces the POTS filter 17 (in the telephony voice spectrum), based upon the connection status (e.g., off-hook or on-hook, respectively) of the POTS device 10. There are numerous advantages of this arrangement of the POTS filter 17 relative to the switch 13. Because the POTS filter 17 is situated beyond the switch 13 within the DSL-ready POTS device 10, the POTS filter 17 is physically separate from the telephone line when the POTS device 10 is in a disconnected status and does not degrade the DSL device performance. In fact, the arrangement improves network stability, sidetone, ringer load, and termination impedance. The POTS filter 17 is not subjected to ringing voltage (except perhaps during ring trip). Therefore, greater flexibility is afforded in the choice of filter elements, in that passive and active elements can be utilized and in that filters of higher order (higher precision) can be employed. With this implementation, there could be a reduction in complexity and cost, as compared to prior art CP filter implementations, depending upon the selected filter design. Finally, the arrangement extends DSL loop reach.

Note that the POTS filter 17 of FIG. 1 is a one-to-one port device, unlike conventional POTS splitters, which are typically one-to-two port devices with one port receiving the combined signal and the other two each outputting a respective channel. However, the functionality of the POTS filter 17 and the POTS splitter are similar in that they both parse out a POTS channel from a communications connection having more than one communications channel. Accordingly, the POTS filter 17 of FIG. 1 can be implemented with a POTS splitter, if desired, by using only two of its ports. Many designs of POTS splitters are known in the art.

Figure 2:
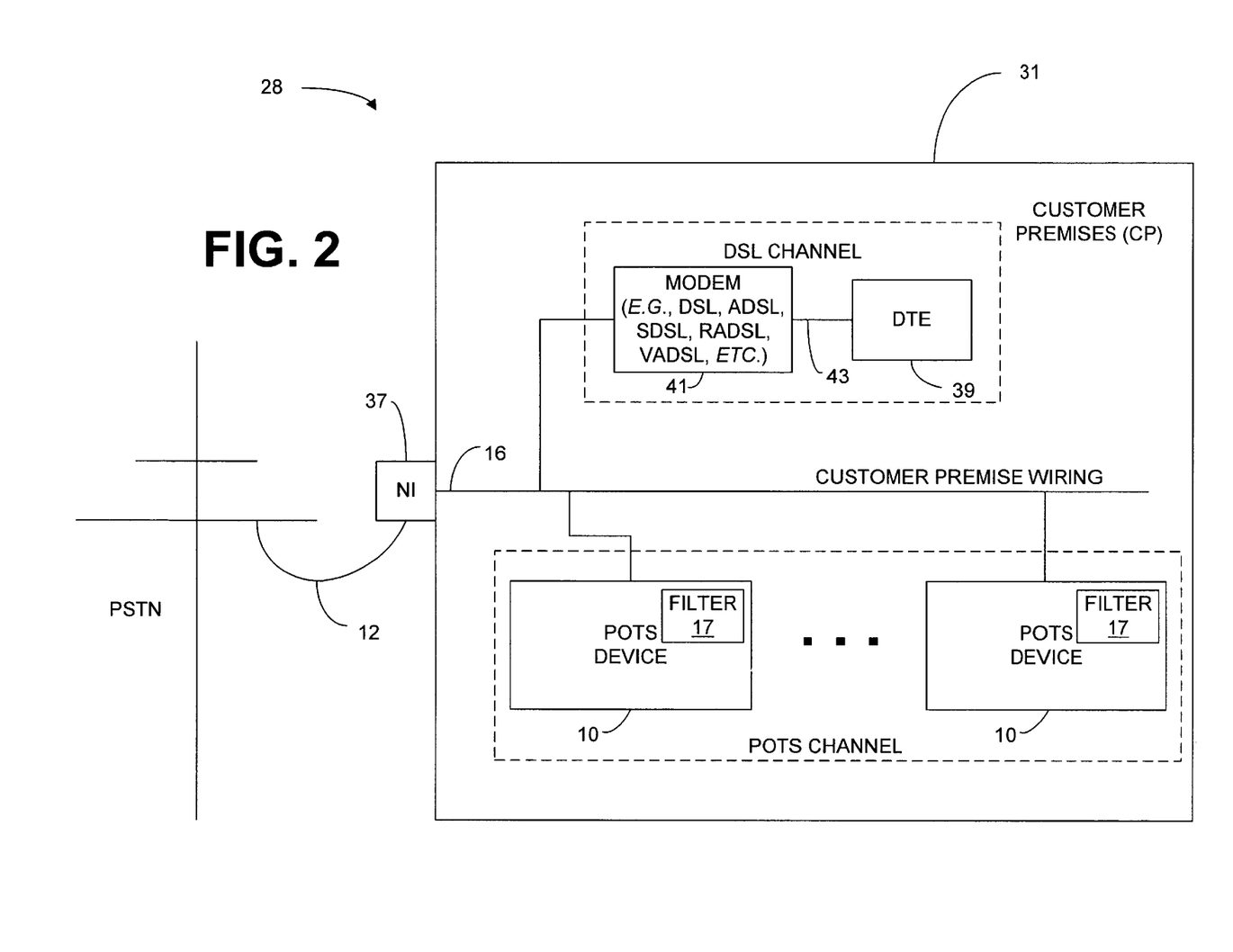
FIG. 2 is a physical view of a distributed POTS filter (DPF) system utilizing a plurality of POTS devices of FIG. 1 at a customer premises (CP)

A distributed POTS filter (DPF) system 28 that utilizes a plurality of DSL-ready POTS devices 10 (FIG. 1) is shown in FIG. 2. Referring to FIG. 2, a customer premises (CP) 31 is shown with a plurality of the DSL-ready POTS device 10 connected directly to CP wiring 16. Any number of DSL-ready POTS devices 10 can be supported, up to the ringer equivalence number (REN) limit. The CP wiring 16 can be connected to the subscriber loop 12 by way of a conventional network interface (NI) 37. The network interface 37 is well known in the art.

One or more data terminal equipment (DTE) devices 39 can be interfaced with the CP wiring 16 by way of any suitable communications device 41, for instance, a data channel modem, or digital modem, in order to permit communications over one or more of the XDSL channels on the loop 12. These xDSL channels can exist concurrently with the POTS communications channel on the telephone connection 12 without any appreciable interference to each, in accordance with the invention. A local connection 43 interconnects each DTE 39 with a communications device 41. In the preferred embodiment, the communications device 41 is a conventional digital subscriber line (DSL) modem. A router could also be employed as the communications device 41.

Figure 3:
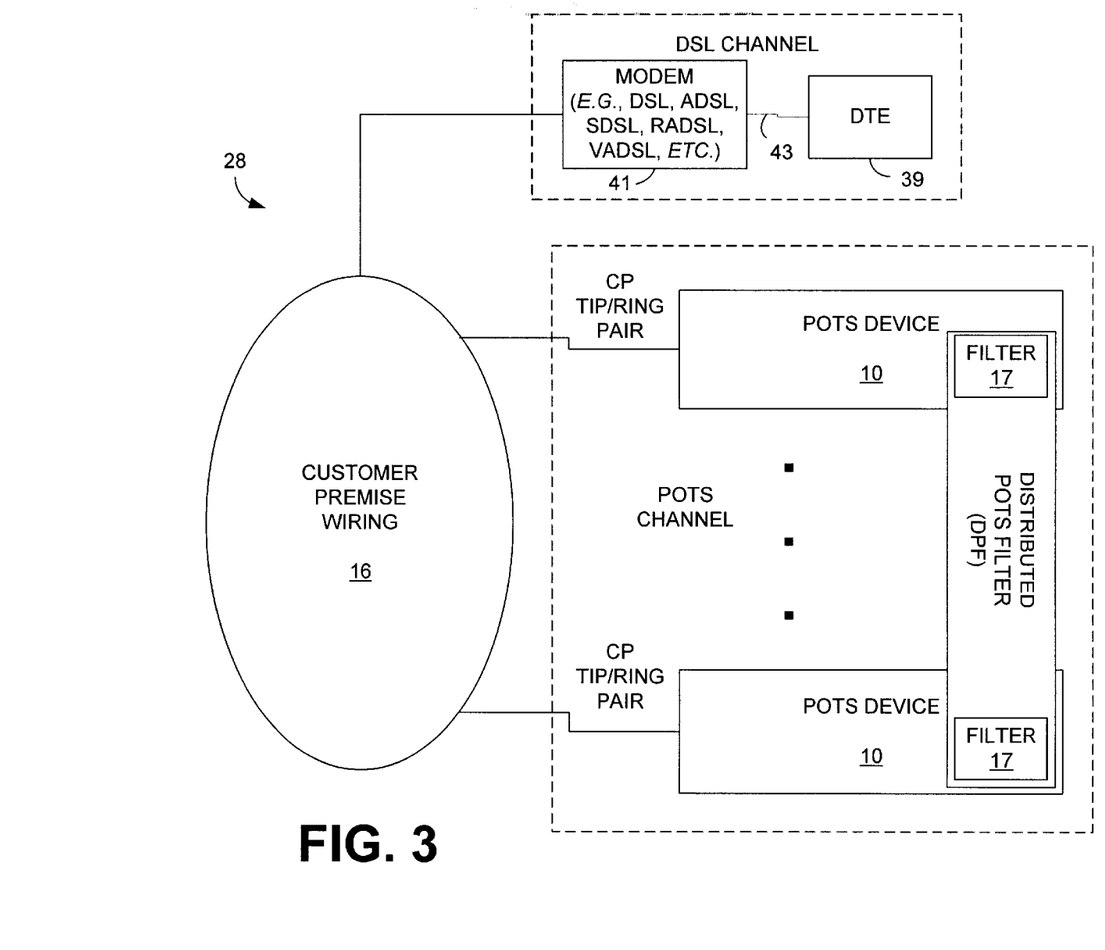
FIG. 3 is a functional view of the DPF system of FIG. 2.

FIG. 3 is an abstract functional view of the DPF system 28 (FIG. 2) showing that the DPF system 28 can be viewed as implementing a plurality of parallel distributed POTS filters 17, each of which is situated within a respective DSL-ready POTS device 10. As shown, these distributed POTS filters 17 are in parallel with the DSL channel communications device, the DTE 39, relative to the CP wiring 16.

Figure 4A:
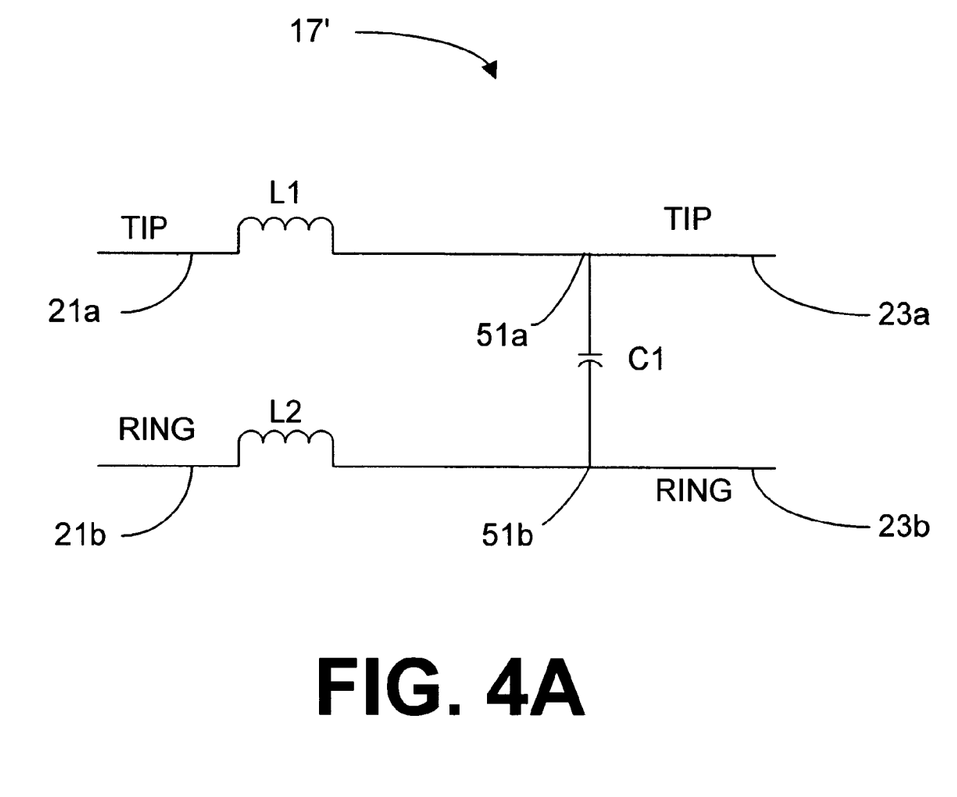
FIG. 4A is a circuit diagram of a possible implementation of a POTS filter of FIG. 1.

The POTS filter 17 of FIG. 1 can be configured in many ways and many implementations are known in the art. A possible implementation (a nonlimiting example) of the POTS filter 17 is shown in FIG. 4A and generally denoted by reference numeral 17'. The POTS filter 17' is essentially a 2nd-order low pass filter (LPF) and is well known in the art. In architecture, referring to FIG. 4A, the POTS filter 17" includes, on the tip side, an inductor L1 connecting the tip line 21a from the switch 13 (FIG. 1) to the tip line 23a, which is connected to the transmitter and/or receiver block 18. On the ring side, an inductor L2 connects ring line 21b from the switch 13 to the ring line 23b. A capacitor C1 is connected between lines 23a, 23b. In operation, the circuit exhibits high impedance to high frequency signals (DSL signals) and low impedance to low frequency signals (POTS signals). In the preferred embodiment, inductor L1, inductor L2, and capacitor C1 have the following circuit values: 8mH, 8mH, and 56 nF, respectively.

Figure 4B:
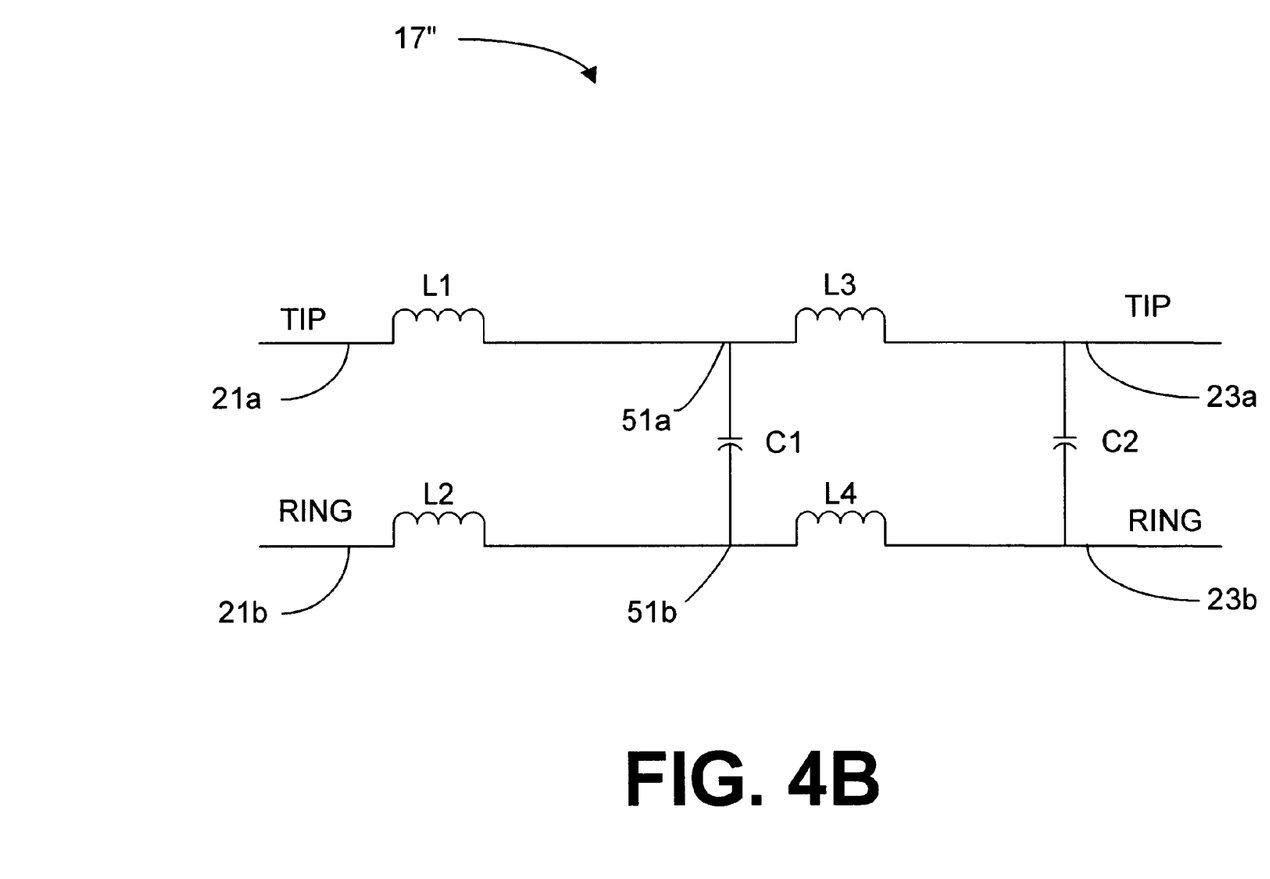
FIG. 4B is a circuit diagram of another possible implementation of a POTS filter of FIG. 1.

Another possible implementation of the POTS filter 17 is shown in FIG. 4B and generally denoted by reference numeral 17". The POTS filter 17" is essentially a 4th-order LPF and is well known in the art. In architecture, referring to FIG. 4B, the POTS filter 17" includes, on the tip side, an inductor L1 in series with an inductor L3 connecting the tip line 21a from the switch 13 (FIG. 1) to the tip line 23a, which is connected to the transmitter and/or receiver block 18 (FIG. 1). On the ring side, an inductor L2 in series with an inductor L4 connects ring line 21b from the switch 13 to the ring line 23b. A capacitor C1 is connected between nodes 51a, 51b. A capacitor C2 is connected between the nodes 23a, 23b. In operation, the circuit exhibits high impedance to high frequency signals (DSL) and low impedance to low frequency signals (POTS signal). In the preferred embodiment, inductors L1–L4 and capacitors C1–C2 have the following circuit values: 8mH, 8mH, 8mH, 8mH, 56 nF, and 56 nF, respectively.

Figure 4C:
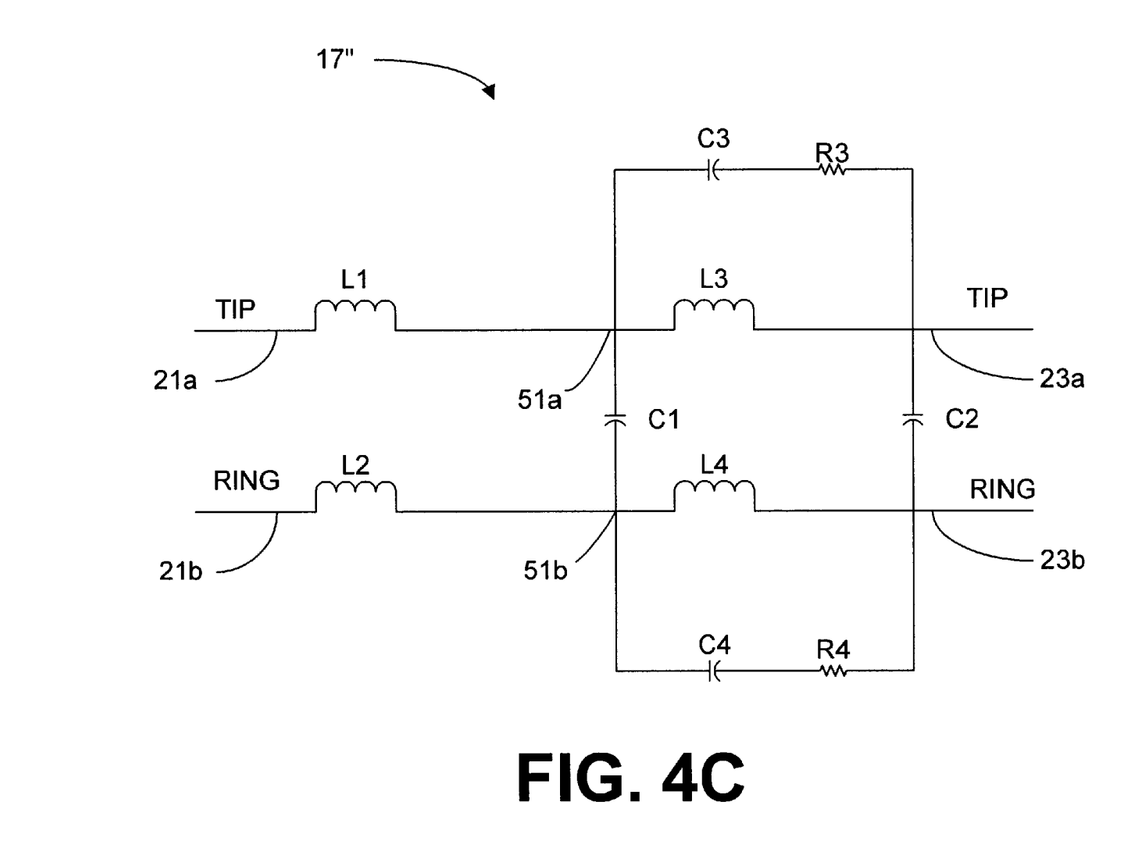
FIG. 4C is a circuit diagram of yet another possible implementation of a POTS filter of FIG. 1, which provides improved sidetone.

Still another possible implementation of the POTS filter 17 is shown in FIG. 4C and generally denoted by reference numeral 17"'. The POTS filter 17"' of FIG. 4C is basically another LPF and is preferred in that it has demonstrated excellent sidetone performance. Many conventional POTS filters demonstrate very poor sidetone performance. In general, the improved POTS filter 17"' of FIG. 4C utilizes a tuning technique (tuning circuits C3, R3 and C4, R4) to improve sidetone, but is still a passive POTS filter device. The tuned frequency and quality factor Q are optimized to improve sidetone in the region most required, in this case, are optimized in the range between about 1 KHz and about 3 KHz. Note that commonly assigned U.S. Pat. No. 5,848,150 to T. J. Bingel, which is incorporated by reference, describes the POTS filter 17"' in further detail.

More specifically, as shown in FIG. 4C, the POTS filter 17"' is implemented by modifying a balanced 5th-order 0.01 dB-ripple Chebyshev filter (note that the $5^{th}$ reactance component is based upon a 27 to 33 nF capacitance associated with the second channel communications device and which appears between connections 21a, 21b) with tuning circuit components, comprised of a capacitor (C3, C4) in series with a de-Q resistor (R3, R4, respectively) on each balanced side.

In architecture, referring to FIG. 4C, the POTS filter 17"' includes, on the tip side, an inductor L1 connected to the tip line 21a from the automatic control mechanism 14 (FIG. 1). A series combination of a capacitor C3 and a resistor R3 is connected between the node 51a and a node 23a. Also, between the nodes 51a and 23a is an inductor L3. In the preferred embodiment, inductor L1, inductor L3, resistor R3, and capacitor C3 have the following circuit values: 8mH, 8mH, 100 Ω, and 1 µF, respectively.

On the ring side of the circuit, an inductor L2 is connected to the ring line 21b. An inductor L4 is situated between the nodes 5b and 23b. Also, between these nodes 51b and 23b is situated a series combination of a capacitor C4 and a resistor R4. In the preferred embodiment, inductor L2, inductor L4, resistor R4, and capacitor C4 have the following circuit values: 8mH, 8mH, 100 Ω, and 1 µF, respectively.

The inductors L1 and L2, as well as the inductors L3 and L4, may be implemented as mutually coupled inductors. In other words, the inductors L1 and L2 may be implemented with a first transformer, and/or the inductors L3 and L4 may be implemented with a second transformer. Use of these transformers may reduce the cost of the POTS filter 17".

Several capacitors are connected between the tip and ring sides. In particular, a capacitor C2 is connected between tip and ring lines 23a, 23b. In the preferred embodiment, capacitor C2 is 27 nF. Further, a capacitor C1 is connected between the tip and ring lines 51a, 51b. In the preferred embodiment, the capacitor C1 is 56 nF.

When the improved POTS filter 17" is operational, the inductors L1, L2 provide high impedance to high frequencies, particularly those frequencies in the xDSL band. The capacitors C3, C4 resonate with the inductors L3, L4 in order to parallel resonate at the geometric mean of about 1 KHz and about 3 KHz. This feature improves telephone sidetone performance in the 1 to 3 KHz band by improving impedance (restoring the resistance and capacitive reactance) presented to the telephone 33 as compared to a pure L-C (inductor/capacitor) filter structure in prior art embodiments.

It should be emphasized that, although no active filters 17 have been specifically shown and specifically described, the filter 17 could be an active filter if it can receive electrical power locally, at least in part. As an example, consider a facsimile machine, which is typically plugged into an electrical outlet at the CP 31. The filter 17 could receive electrical power, directly or indirectly, from the outlet, and utilize the power to implement and enhance filtering functionality, as is known in the art.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, although not an optimal configuration, the filter 17 (FIG. 1) may be implemented as an unbalanced circuit (for example, in the filter 17', either L1 or L2 would be eliminated). All such modifications and variations are intended to be included herein within the scope of this disclosure and the present invention and protected by the following claims.

What is claimed is:

1. A POTS device for connection to a subscriber loop, said POTS device comprising:
   a housing;
   a POTS hook switch;
   a POTS transmitter, receiver, or transceiver; and
   a low-pass filter for interconnecting said POTS hook switch with said POTS transmitter, receiver, or transceiver;
   wherein said POTS hook switch, said POTS transmitter, receiver, or transceiver, and said low-pass filter are located within said housing;
   wherein said POTS hook switch connects said subscriber loop to said low-pass filter when said POTS hook switch connects the POTS device to said subscriber loop, and wherein said POTS hook switch disconnects said low-pass filter from said subscriber loop when said POTS hook switch disconnects the POTS device from said subscriber loop.

2. The device of claim 1, wherein said device is a telephone.

3. The device of claim 1, wherein said device is a facsimile machine.

4. The device of claim 1, wherein said device is a modem.

5. The device of claim 1, wherein said low-pass filter is designed to attenuate DSL signals communicated along said subscriber loop.

6. The device of claim 1, wherein said low-pass filter is passive.

7. The device of claim 1, wherein said low-pass filter is active.

8. The device of claim 1, further comprising in combination with said device:
   a subscriber loop interconnected with said device;
   a DSL modem interconnected with said subscriber loop and sending and receiving DSL signals; and
   wherein said low-pass filter attenuates said DSL signals when said POTS hook switch connects said low-pass filter to said subscriber loop.

9. A POTS device for connection to a subscriber loop, said POTS device comprising:
   a POTS hook switch means;
   a POTS transmitter, receiver, or transceiver means; and
   a low-pass filter means for interconnecting said POTS hook switch means with said POTS transmitter, receiver, or transceiver means and for filtering a DSL frequency band;
   wherein said POTS hook switch means, said POTS transmitter, receiving or transceiver means, and said low-pass filter means are located within said POTS device;
   wherein said POTS hook switch means connects said subscriber loop to said low-pass filter means when said POTS hook switch means connects the POTS device to said subscriber loop, and wherein said POTS hook switch means disconnects said low-pass filter mean from said subscriber loop when said POTS hook device means disconnects the POTS device from said subscriber loop.

10. The device of claim 9, wherein said device is a telephone.

11. The device of claim 9, wherein said device is a facsimile machine.

12. The device of claim 9, wherein said device is a modem.

13. The device of claim 9, wherein said low-pass filter means employs passive circuit components.

14. The device of claim 9, wherein said low-pass filter means employs active circuitry.

15. The device of claim 14, wherein said low-pass filter means utilizes power from a source other than said subscriber loop.

16. The device of claim 9, further comprising in combination with said device:
   a subscriber loop means interconnected with said device;
   a DSL modem means interconnected with said subscriber loop means and sending and receiving DSL signals; and
   wherein said low-pass filter means attenuates said DSL signals when said POTS hook switch means connects said low-pass filter means to said subscriber loop means.

17. A method for a POTS device for connection to a subscriber loop, comprising the steps of:
   coupling a POTS hook switch to a POTS transmitter, receiver, or transceiver;
   filtering out high frequency signals from voice band signals, via a low-pass filter, communicated between said POTS hook switch and said POTS transmitter, receiver, or transceiver;
   connecting said low-pass filter to said subscriber loop via said POTS hook switch when said POTS hook switch connects the POTS device to said subscriber loop; and
   disconnecting said low-pass filter from said subscriber loop via said POTS hook switch when said POTS hook switch disconnects the POTS device from said subscriber loop;
   wherein said POTS hook switch, said POTS transmitter, receiver, or transceiver, and said low-pass filter are located within said POTS device.

18. The method of claim 17, wherein said device is a telephone.

19. The method of claim 17, wherein said device is a facsimile machine.

20. The method of claim 17, wherein said device is a modem.

21. The method of claim 17, wherein said filtering is performed with passive circuit components.

22. The method of claim 17, wherein said filtering is performed with active circuit components.

23. In a telephone for connection to a telephone line, the telephone having a telephone hook switch, an improvement comprising a filter configured to receive a POTS signal and a DSL signal on the telephone line, the filter designed to permit substantial passage of said POTS signal while preventing substantial passage of said DSL signal, the filter being connected to and disconnected from the telephone line via said telephone hook switch;
   wherein said telephone hook switch and said filter are located within the telephone.

24. The telephone of claim 23, wherein said filter is designed to attenuate DSL signals communicated along a subscriber loop.

25. The telephone of claim 23, wherein said filter is passive.

26. The telephone of claim 23, wherein said filter is active.

27. The telephone of claim 23, further comprising in combination with said telephone:
   a subscriber loop interconnected with said telephone;
   a DSL modem interconnected with said subscriber loop and sending and receiving DSL signals; and
   wherein said filter attenuates said DSL signals when said hook switch connects said filter to said subscriber loop.

28. A POTS device for connection to a subscriber loop, said POTS device comprising:
   a POTS hook switch;
   a POTS transmitter, receiver, or transceiver, and
   a low-pass filter for interconnecting said POTS hook switch with said POTS transmitter, receiver, or transceiver;
   wherein said, POTS hook switch, said POTS transmitter, receiver, or transceiver, and said low-pass filter are located within said POTS device;
   wherein said POTS hook switch connects said subscriber loop to said low-pass when said POTS hook switch connects the POTS device to said subscriber loop, and wherein said POTS hook switch disconnects said low-pass filter from said subscriber loop when said POTS hook switch disconnects the POTS device from said subscriber loop.

29. The device of claim 28, wherein said device is a telephone.

30. The device of claim 28, wherein said device is a facsimile machine.

31. The device of claim 28, wherein said device is a modem.

32. The device of claim 28, wherein said low-pass filter is designed to attenuate DSL signals communicated along said subscriber loop.

33. The device of claim 28, wherein said low-pass filter is passive.

34. The device of claim 28, wherein said low-pass filter is active.

35. The device of claim 28, further comprising in combination with said device:
   a subscriber loop interconnected with said device;
   a DSL modem interconnected with said subscriber loop and sending and receiving DSL signals; and
   wherein said low-pass filter attenuates said DSL signals when said POTS hook switch connects said filter to said subscriber loop.

* * * * *